(12) United States Patent
Le et al.

(10) Patent No.: US 8,427,747 B2
(45) Date of Patent: Apr. 23, 2013

(54) OLED LIGHT EXTRACTION FILMS LAMINATED ONTO GLASS SUBSTRATES

(75) Inventors: Ha T. Le, Saint Paul, MN (US); Jun-Ying Zhang, Woodbury, MN (US); Sergey A. Lamansky, Apple Valley, MN (US); Scott M. Tapio, Falcon Heights, MN (US); Encai Hao, Woodbury, MN (US); David B. Stegall, Austin, TX (US); Serena L. Mollenhauer, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 451 days.

(21) Appl. No.: 12/765,019

(22) Filed: Apr. 22, 2010

(65) Prior Publication Data

US 2011/0261461 A1  Oct. 27, 2011

(51) Int. Cl.
 G02B 1/10  (2006.01)
 G02B 5/28  (2006.01)
 H01L 27/15  (2006.01)

(52) U.S. Cl.
 USPC .......... 359/586; 257/79; 257/98; 362/84; 359/589

(58) Field of Classification Search .......... 359/586, 359/589; 257/79, 98; 362/84
See application file for complete search history.

(56) References Cited

U.S. PATENT DOCUMENTS

| 7,081,180 | B2 | 7/2006 | Chen et al. |
| 7,473,932 | B2 | 1/2009 | Cho et al. |
| 2004/0114248 | A1 | 6/2004 | Hokazono et al. |
| 2004/0115846 | A1 | 6/2004 | Otake et al. |
| 2006/0019114 | A1 | 1/2006 | Thies et al. |
| 2007/0063628 | A1 | 3/2007 | Cok et al. |
| 2007/0252155 | A1* | 11/2007 | Cok .......................... 257/79 |
| 2008/0130122 | A1 | 6/2008 | Egi et al. |
| 2008/0136857 | A1 | 6/2008 | Ogasawara et al. |
| 2008/0138657 | A1 | 6/2008 | Lee et al. |
| 2008/0165315 | A1 | 7/2008 | Nishida et al. |
| 2008/0196822 | A1 | 8/2008 | Satoh et al. |
| 2008/0203908 | A1 | 8/2008 | Hasegawa et al. |
| 2009/0001575 | A1 | 1/2009 | Takizawa et al. |
| 2009/0015142 | A1* | 1/2009 | Potts et al. ................... 313/504 |
| 2009/0021151 | A1 | 1/2009 | Fukuda |
| 2009/0128022 | A1 | 5/2009 | Shim et al. |
| 2009/0128916 | A1 | 5/2009 | Noro |
| 2010/0110551 | A1 | 5/2010 | Lamansky et al. |
| 2010/0150513 | A1 | 6/2010 | Zhang et al. |

FOREIGN PATENT DOCUMENTS

| CN | 101114697 A1 | 1/2008 |
| JP | 2005156642 | 6/2005 |
| JP | 2005-313638 | 11/2005 |
| JP | 2008-87258 | 4/2008 |
| JP | 2009-48835 | 3/2009 |
| JP | 2009-110873 | 5/2009 |

(Continued)

Primary Examiner — Scott J Sugarman
Assistant Examiner — Robert E Tallman

(57) ABSTRACT

A light extraction film laminated to a glass substrate for organic light emitting diode (OLED) devices. The light extraction film includes a flexible substantially transparent film, a low index nanostructured layer applied to the film, and a high index planarizing backfill layer applied over the nanostructured layer. A glass substrate is laminated to the flexible substantially transparent film on a side opposite the nanostructured layer and including an ultra-low index region between the film and the glass substrate. The ultra-low index region is used to reduce optical losses occurring with the glass substrate.

6 Claims, 2 Drawing Sheets

FOREIGN PATENT DOCUMENTS

| | | |
|---|---|---|
| JP | 2009-146567 | 7/2009 |
| KR | 2005-0003398 | 1/2005 |
| KR | 2007-0050786 | 5/2007 |
| KR | 2008-0027907 | 3/2008 |
| KR | 2008-0036802 | 4/2008 |
| WO | WO 2008/123833 A1 | 10/2008 |
| WO | WO 2009/043815 A1 | 4/2009 |

* cited by examiner

OLED LIGHT EXTRACTION FILMS LAMINATED ONTO GLASS SUBSTRATES

BACKGROUND

Organic Light Emitting Diode (OLED) devices include a thin film of electroluminescent organic material sandwiched between a cathode and an anode, with one or both of these electrodes being a transparent conductor. When a voltage is applied across the device, electrons and holes are injected from their respective electrodes and recombine in the electroluminescent organic material through the intermediate formation of emissive excitons.

In OLED devices, over 70% of the generated light is typically lost due to processes within the device structure. The trapping of light at the interfaces between the higher index organic and Indium Tin Oxide (ITO) layers and the lower index substrate layers is the major cause of this poor extraction efficiency. Only a relatively small amount of the emitted light emerges through the transparent electrode as "useful" light. The majority of the light undergoes internal reflections, which result in its being emitted from the edge of the device or trapped within the device and eventually being lost to absorption within the device after making repeated passes.

Both flexible and rigid substrates are used in OLED devices, and there is thus a need for light extraction films compatible with both flexible and rigid substrates.

SUMMARY

A light extraction film, consistent with the present invention, includes a flexible substantially transparent film, a low index nanostructured layer applied to the film, and a high index planarizing backfill layer applied over the nanostructured layer. A glass substrate is laminated to the flexible substantially transparent film on a side opposite the nanostructured layer and including an ultra-ultra-low index region between the film and the glass substrate.

A method of making a light extraction film, consistent with the present invention, includes providing a flexible substantially transparent film, applying a low index nanostructured layer to the film, and applying a high index planarizing backfill layer over the nanostructured layer. The method also includes laminating a glass substrate to the flexible substantially transparent film on a side opposite the nanostructured layer and providing an ultra-low index region between the film and the glass substrate.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention relate to light extraction films and uses of them for OLED devices. Examples of light extraction films are described in U.S. Patent Applications Publication Nos. 2009/001575 and 2009/0015142, both of which are incorporated herein by reference as if fully set forth.

Figure 1:
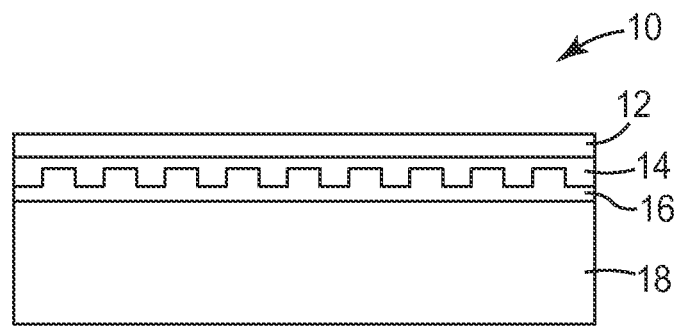
FIG. 1 is a diagram of a light extraction film having nanostructures.

FIG. 1 is a diagram of the construction of a light extraction film 10 having nanostructures. Light extraction film 10 includes a flexible substantially transparent film substrate 18, a low index nanostructured layer 16, a high index planarazing backfill layer 14, and an optional protective layer 12. The nanostructured layer 16 includes nanostructures, meaning a structure having at least one dimension less than 2 microns and preferably less than 1 micron. The nanostructured layer can have a periodic, quasi-periodic, or random distribution or pattern of optical nanostructures, including photonic crystal structures or linear gratings. The term photonic crystal structures refers to periodic or quasi-periodic optical nanostructures interspersed with a material of sufficiently different index of refraction that will enable the structure to produce gaps in the spectrum of allowed electromagnetic modes in the material.

The nanostructures can be one-dimensional, meaning they have at least one dimension, such as width, less than 2 microns. One-dimensional nanostructures include, for example, continuous or elongated prisms or ridges. The nanostructures can also be two-dimensional, meaning they have at least two dimensions, for example two in-plane directions, less than 2 microns. Two-dimensional nanostructures include, for example, round or square shaped posts.

Planarazing backfill layer 14 is applied over nanostructured layer 16 to planarize it and provide for index contrast. Low index nanostructure layer 16 with high index backfill layer 14 means that backfill layer 14 has a higher index of refraction than nanostructured layer 16 and that backfill layer 14 and nanostructured layer 16 have a sufficient difference in refractive indices to enhance light extraction of an OLED device in optical communication with light extraction film 10. Low index nanostructured layer 16 typically has an index of refraction in the range of 1.4-1.6, although different ranges can be used. Examples of high index backfill layers for light extraction films are described in U.S. patent application Ser. No. 12/262,393 and filed Oct. 31, 2008, which is incorporated herein by reference as if fully set forth.

Figure 2:
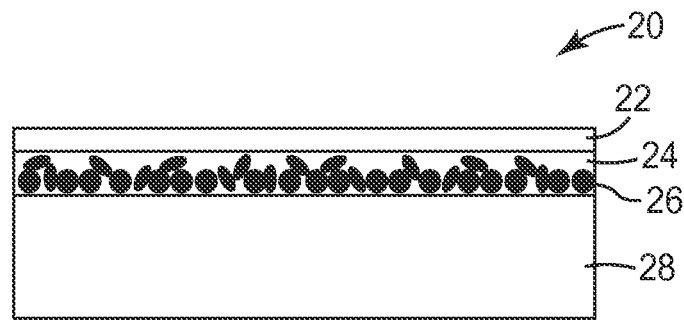
FIG. 2 is a diagram of a light extraction film having nanoparticles.

FIG. 2 is a diagram of a light extraction film 20 having nanoparticles. Light extraction film 20 includes a flexible substantially transparent film substrate 28, a low index nanostructured layer 26, a high index planarazing backfill layer 24, and an optional protective layer 22. The nanostructured layer 26 includes nanoparticles, meaning particles having at least one dimension less than 2 microns and preferably less than 1 micron. The nanoparticles can be composed of organic materials or other materials, and they can have any particle shape, regular or irregular. The nanoparticles can alternatively be implemented with porous particles. The distribution of nanostructures can also have varying pitches and feature size. At least a portion of the nanoparticles are preferably in contact with the flexible substrate, and the nanoparticles may have voids beneath them. The layer of nanoparticles can be implemented with nanoparticles in a monolayer, with a layer having agglomerations of nanoparticles, or in a multi-layer. The nanoparticles can be coated without use of a binder, which can result in the agglomerations of nanoparticles. Furthermore, the nanoparticles are preferably coated or otherwise applied in a surface layer manner to the flexible substrate.

Examples of nanoparticles used in light extraction films are described in U.S. patent application Ser. No. 12/336,889 and filed Dec. 17, 2008, which is incorporated herein by reference as if fully set forth.

Planarazing backfill layer 24 is applied over nanostructured layer 26 to planarize it and provide for index contrast. Low index nanostructure layer 26 with high index backfill layer 24 means that backfill layer 24 has a higher index of refraction than the nanoparticles in nanostructured layer 26 and that backfill layer 24 and the nanoparticles in nanostructured layer 26 have a sufficient difference in refractive indices to enhance light extraction of an OLED device in optical communication with light extraction film 20.

Materials for the substrates, low index layers, high index layers, and optional protective layers for light extraction films 10 and 20 are provided in the published patent applications identified above. Processes for making light extraction films 10 and 20 are also provided in the published patent applications identified above.

Figure 3:
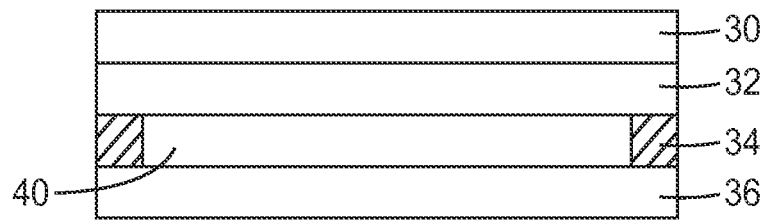
FIG. 3 is a diagram of an OLED device with a light extraction film laminated onto a glass substrate with an adhesive and an air gap.

FIG. 3 is a diagram of an OLED device 30 with a light extraction film 32 laminated onto a glass substrate 36 with an adhesive 34 and a gap 40 containing air, or an inert gas such as nitrogen or argon. Light extraction film 32 is laminated with adhesive 34 and gap 40 on a side of the flexible film substrate, such as films 18 and 28, opposite the nanostructured layer to provide for a region of ultra-low refractive index between light extraction film 32 and glass substrate 36. The ultra-low refractive index region is used to ensure that no or negligible additional optical losses occur with glass substrate 36. The width of gap 40 is controlled to provide for the ultra-low index region. Adhesive 34 can be arranged around the perimeter of glass substrate 36 to provide gap 40, or adhesive 34 can be patterned on glass substrate 36, for example in stripes or a square pattern, to provide multiple air gaps or pockets.

Figure 4:
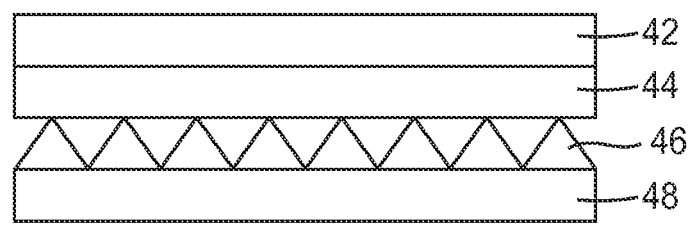
FIG. 4 is a diagram of an OLED device with a light extraction film laminated onto a glass substrate with a structured adhesive.

FIG. 4 is a diagram of an OLED device 42 with a light extraction film 44 laminated onto a glass substrate 48 with a structured adhesive 46. Light extraction film 44 is laminated with adhesive 46 on a side of the flexible film substrate, such as films 18 and 28, opposite the nanostructured layer to provide for a region of ultra-low refractive index between light extraction film 44 and glass substrate 48. The ultra-low refractive index region is used to enhance the light extraction from OLED device 42 through glass substrate 48. The structuring of adhesive 46 provides for entrapment of air between light extraction film 44 and glass substrate 48, and the entrapped air provides for the ultra-low index region. Adhesive 46 can be structured in a variety of ways such as through use of a tool having a structured pattern to be imparted in adhesive 46 to create air pockets during lamination. As an alternative to use of a structured adhesive, the ultra-low index region can comprise an antireflective (AR) structured surface, and examples of AR structured surfaces are described in U.S. Provisional Patent Application Ser. No. 61/141,517 and filed Dec. 30, 2008, which is incorporated herein by reference as if fully set forth. As with a structured adhesive, the AR structured surface provides for entrapment of air to create the ultra-low index region.

Figure 5:
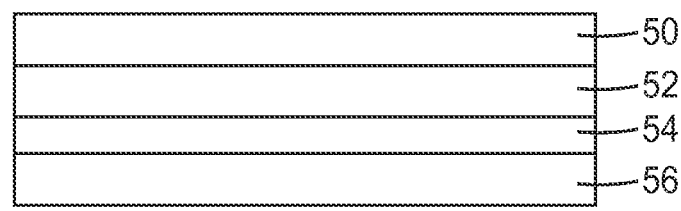
FIG. 5 is a diagram of an OLED device with a light extraction film laminated onto a glass substrate with an ultra-low index material.

FIG. 5 is a diagram of an OLED device 50 with a light extraction film 52 laminated onto a glass substrate 56 with an ultra-low index material 54. Light extraction film 52 is laminated with an ultra-low index material 54 on a side of the flexible film substrate, such as films 18 and 28, opposite the nanostructured layer to provide for a region of ultra-low refractive index between light extraction film 52 and glass substrate 56. The ultra-low refractive index region is used to enhance the light extraction from OLED device 50 through glass substrate 56. Examples of ultra-low index materials are described in U.S. Patent Application Ser. Nos. 61/294,600 and 61/294,577, both of which were filed Jan. 13, 2010 and are incorporated herein by reference as if fully set forth.

Light extraction films 32, 44, and 52 can be implemented with, for example, light extraction films 10 and 20 described above or other films for enhancing light extraction from OLED devices. The ultra-low refractive index regions typically have an index of refraction in the range of 1.0-1.5, although different ranges can be used. The light extraction films can be laminated using any method for laminating a film to a glass substrate. A method of laminating an adherent is described in U.S. Patent Application Publication No. 2008/0196822, which is incorporated herein by reference as if fully set forth. Providing the light extraction films laminated to a glass substrate makes them compatible with OLED devices that use or require rigid substrates. Furthermore, the use of the ultra-low refractive index regions enhances light extraction from the OLED devices by helping to reduce the losses that occur when OLED devices are laminated directly onto glass substrates.

EXAMPLES

Example 1

An OLED device was constructed as in Example 5 of U.S. patent application Ser. No. 12/262,393, identified above, except that the thickness of the Indium-Tin-Oxide (ITO) layer was 100 nm.

A square approximately 2.54 cm×2.54 cm (1 inch×1 inch) was precision cut out of OCA 8171 (an optical adhesive available from 3M Company, St. Paul, Minn.) using a razor blade. The OLED device was laminated onto glass maintaining a controlled-width air gap using the precision cut OCA 8171 film. In this device, the air gap was provided by leaving air pockets between the film and the glass in the active area of the OLED device.

On-axis luminance-current-voltage (LIVs) characteristics of the devices in the 0-20 mA/cm$^2$ current density range were recorded using a PR650 photopic camera (available from Photo Research, Inc., Chatsworth, Calif.) and a Keithley 2400 Sourcemeter (available from Keithley Instruments, Inc., Cleveland, Ohio). The LIV measurements showed that the laminated OLED device had a peak efficiency of 35 Cd/A at 1000 nits which was very similar to the peak efficiency of the device before lamination which was 36 Cd/A at 1000 nits. The on-axis luminance at 10 mA/m$^2$ was 5221 Cd/m$^2$ before lamination and 5729 Cd/m$^2$ after lamination. The integrated intensity at 10 mA/m$^2$ was 10460 Lumens/m$^2$ before lamination and 11192 Lumens/m$^2$ after lamination.

Example 2

Comparative Example

An OLED device was constructed as in Example 5 of U.S. patent application Ser. No. 12/262,393, except that the thickness of the ITO layer was 100 nm. The OLED device was laminated onto glass using a continuous layer of OCA 8171 film. The LIV measurements of the laminated OLED device showed that external efficiency dropped significantly compared to the device without lamination. LIV measurements showed that the laminated OLED device had a peak efficiency of 36 Cd/A at 1000 nits which was significantly less than the peak efficiency of the device before lamination which was 42 Cd/A at 1000 nits.

Example 3

An OLED device was constructed that was similar to the device of Example 1, except that the device was constructed by first laminating a backfilled 500 nm-pitch photonic crystal nanostructured film onto glass and then depositing the ITO layer and then the OLED layer.

In order to laminate the photonic crystal onto glass, a precision cut OCA 8171 film was prepared as in Example 1. A controlled-width air gap between the glass and the active are of the OLED device was created by laminating the photonic crystal film with the precision cut OCA8171 film. For comparison, a copy of the device was constructed without laminating the photonic crystal film onto glass.

LIV measurements were performed as in Example 1. The LIV measurements showed that the laminated OLED device had a peak efficiency of 45 Cd/A at 1000 nits which was the same as the peak efficiency of the device without lamination. The on-axis luminance at 10 mA/m$^2$ was 4282 Cd/m$^2$ without lamination and 5428 Cd/m$^2$ with lamination. The integrated intensity at 10 mA/m$^2$ was 8261 Lumens/m$^2$ without lamination and 10626 Lumens/m$^2$ with lamination.

Example 4

Comparative Example

A device was constructed similar to the device of Example 3, except that a continuous layer of OCA 8171 was used for lamination.

LIV measurements were performed as in Example 1. The LIV measurements showed that the laminated OLED device had a peak efficiency of 32 Cd/A at 1000 nits which was significantly less than the peak efficiency of the device without lamination which was determined to be 42 Cd/A at 1000 nits. The on-axis luminance at 10 mA/m$^2$ was 5215 Cd/m$^2$ without lamination and 3802 Cd/m$^2$ with lamination. The integrated intensity at 10 mA/m$^2$ was 10573 Lumens/m$^2$ without lamination and 8573 Lumens/m$^2$ with lamination.

The invention claimed is:

1. A light extraction film laminated to a glass substrate for organic light emitting diode devices, comprising:
    a flexible transparent film;
    a nanostructured layer having a first surface applied to the flexible transparent film and having a second surface opposite the first surface;
    a planarizing backfill layer applied over the second surface of the nanostructured layer, wherein the backfill layer has a higher index of refraction than the nanostructured layer;
    a glass substrate laminated to the flexible transparent film on a side opposite the nanostructured layer; and
    a region between the flexible transparent film and the glass substrate, wherein the region comprises one or more air gaps enclosed by an adhesive between the flexible transparent film and the glass substrate.

2. The light extraction film of claim 1, wherein the adhesive is patterned in stripes or a square pattern to provide the air gaps.

3. The light extraction film of claim 1, further comprising a protective layer applied over the backfill layer.

4. A method of making a light extraction film laminated to a glass substrate for organic light emitting diode devices, comprising:
    providing a flexible transparent film;
    applying a nanostructured layer to the flexible transparent film, wherein the nanostructured layer has a first surface applied to the flexible transparent film and a second surface opposite the first surface;
    applying a planarizing backfill layer over the second surface of the nanostructured layer, wherein the backfill layer has a higher index of refraction than the nanostructured layer; and
    laminating a glass substrate to the flexible transparent film on a side opposite the nanostructured layer, wherein the laminating step includes providing a region between the flexible transparent film and the glass substrate, wherein the region comprises one or more air gaps enclosed by an adhesive between the flexible transparent film and the glass substrate.

5. The method of claim 4, further comprising patterning the adhesive in stripes or a square pattern to provide the air gaps.

6. The method of claim 4, further comprising applying a protective layer over the backfill layer.

* * * * *